Jan. 28, 1964
J. V. DAVIS
3,119,486
CONVEYING MACHINE
Filed June 8, 1960
5 Sheets-Sheet 1
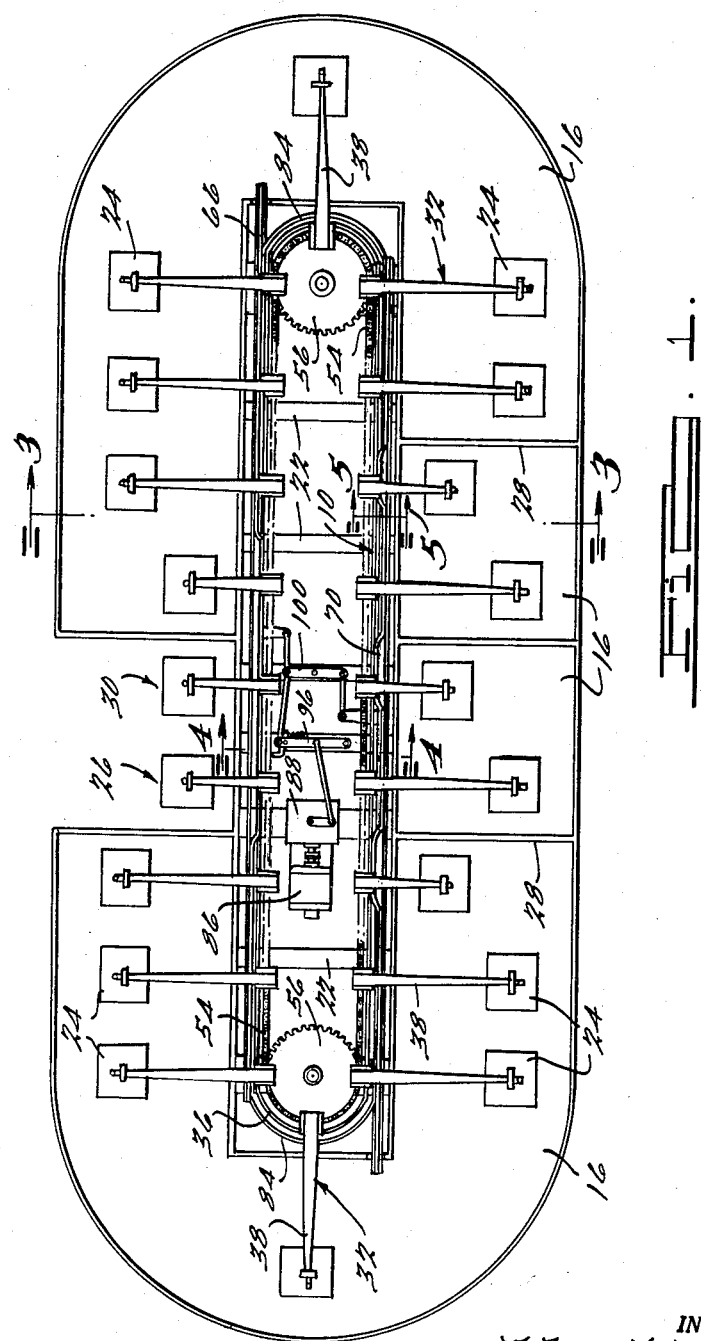
INVENTOR.
John V. Davis.
BY
Harness, Dickey & Pierce.
ATTORNEYS.

Jan. 28, 1964
J. V. DAVIS
3,119,486
CONVEYING MACHINE
Filed June 8, 1960
5 Sheets-Sheet 2
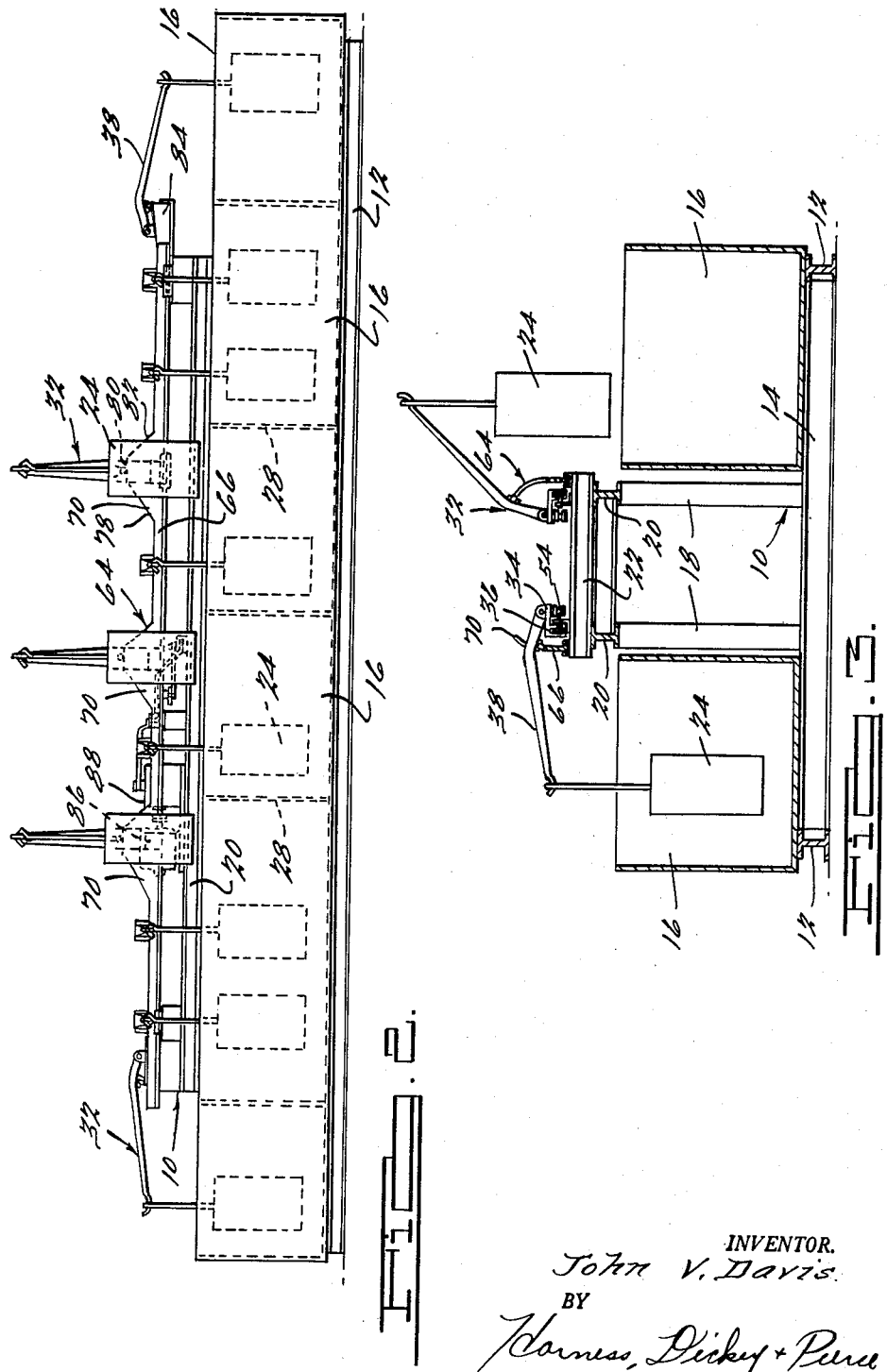
INVENTOR.
John V. Davis
BY
Harness, Dickey & Pierce
ATTORNEYS.

Jan. 28, 1964  J. V. DAVIS  3,119,486
CONVEYING MACHINE
Filed June 8, 1960  5 Sheets-Sheet 3
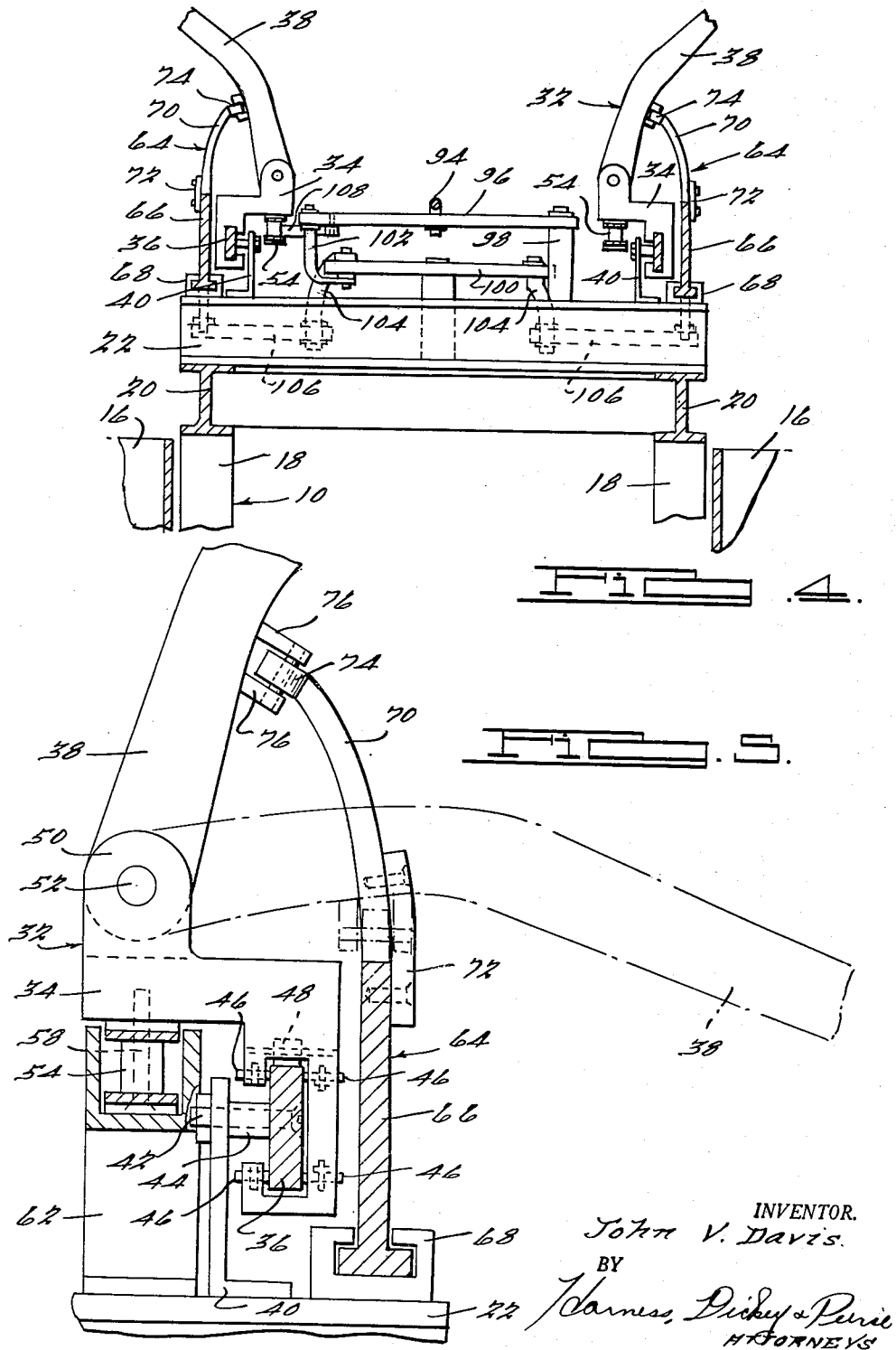
INVENTOR.
John V. Davis.
BY
Harness, Dickey & Pierce
ATTORNEYS.

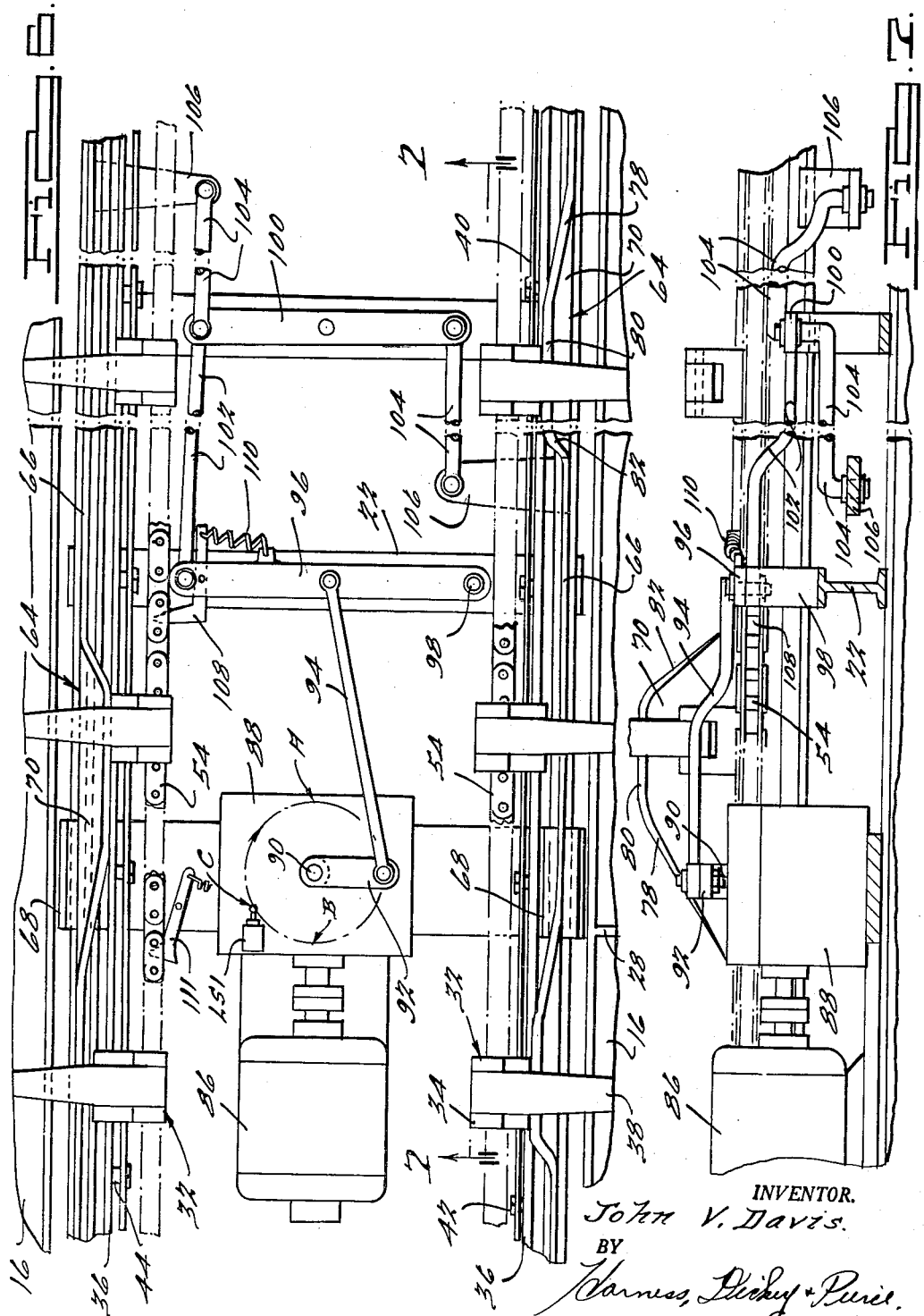

Jan. 28, 1964   J. V. DAVIS   3,119,486
CONVEYING MACHINE

Filed June 8, 1960   5 Sheets-Sheet 5

INVENTOR.
John V. Davis
BY
Harness, Dickey & Pierce.
ATTORNEYS 3,119,486
CONVEYING MACHINE
John V. Davis, Grosse Pointe Farms, Mich., assignor to The Udylite Corporation, Detroit, Mich., a corporation of Delaware
Filed June 8, 1960, Ser. No. 34,818
8 Claims. (Cl. 198—19)

The present invention broadly pertains to conveying apparatus and more particularly to conveying apparatus of the general type employed for conveying workpieces through a series of treating steps in a predetermined treating sequence.

Conveying apparatus of the general type herein described are extensively employed in a large number of industries for automatically processing a variety of workpieces through various treating sequences which often include one or more electrochemical or electroplating steps. The workpieces are conventionally supported on suitable work carriers or racks which are intermittently advanced along a path adjacent to a series of aligned treating receptacles in which the workpieces are sequentially immersed. The conveying apparatuses incorporate suitable lifting or elevating means for periodically lifting the workpieces in order that they can be transferred over the partitions separating adjoining treating receptacles.

Continuous improvements and new developments in treating techniques coupled with rapid changes in product design have brought about an increasing need for conveying machines incorporating maximum flexibility and versatility to quickly adapt them to new treating sequences. The need for increased machine flexibility has contributed toward the construction of conveying machines which are increasingly complex in structure and operation, and which require relatively elaborate control systems for synchronizing the various operating functions of the operative components. As a result, substantial increases in the cost of automated conveying apparatus has occurred in addition to an increasing susceptibility thereof to malfunction resulting in the increased maintenance costs and losses in production efficiency.

It is accordingly a primary object of the present invention to provide a conveying machine that is of simple design, economical manufacture, extremely flexible and versatile in operation, and which is of durable and dependable operation.

Another object of this invention is to provide a conveying machine utilizing flexible drive means for advancing the work carriers and workpieces supported therefrom through a series of treating stations, and incorporating a reciprocable cam elevating mechanism for periodically lifting the work supporting arms in order that the workpieces suspended therefrom can be transferred over the partitions separating adjoining treating receptacles.

Still another object of this invention is to provide a conveying machine of relatively simple design and construction enabling proper coordination of the operating functions thereof by a relatively simple control system.

The foregoing and other objects of this invention are achieved by a conveying machine having a construction characterized by a work carrier supporting rail having a plurality of work carriers movably mounted thereon and including a work supporting arm extending laterally therefrom over an aligned series of treating receptacles. The work carriers are intermittently advanced by a suitable flexible drive mechanism and the workpiece supporting arms are periodically raised and lowered by the co-action with a reciprocable cam elevating mechanism disposed longitudinally of the work carrier supporting rail.

Other objects and advantages of the present invention will become apparent from the following detailed description taken in conjunction with the accompanying drawings, wherein:

FIGURE 1 is a plan view of a conveying machine constructed in accordance with the preferred embodiments of this invention, and illustrating a typical arrangement of treating receptacles therearound;

FIG. 2 is a side elevation view of the conveying machine shown in FIG. 1, and illustrating the reciprocable cam elevating mechanism in the fully retracted position preparatory to the next advancing movement of the flexible drive mechanism;

FIG. 3 is a transverse vertical sectional view of the conveying machine shown in FIG. 1, and taken along line 3—3 thereof;

FIG. 4 is an enlarged fragmentary transverse vertical sectional view of the upper frame portion of the conveying machine shown in FIG. 1, and taken along line 4—4 thereof;

FIG. 5 is an enlarged transverse sectional view through one side portion of the conveying machine shown in FIG. 1, and taken along line 5—5 thereof;

FIG. 6 is an enlarged fragmentary plan view of the machine driven mechanism shown in FIG. 1;

FIG. 7 is a fragmentary longitudinal vertical sectional view of the drive mechanism shown in FIG. 6, and taken along line 7—7 thereof;

Figure 8:
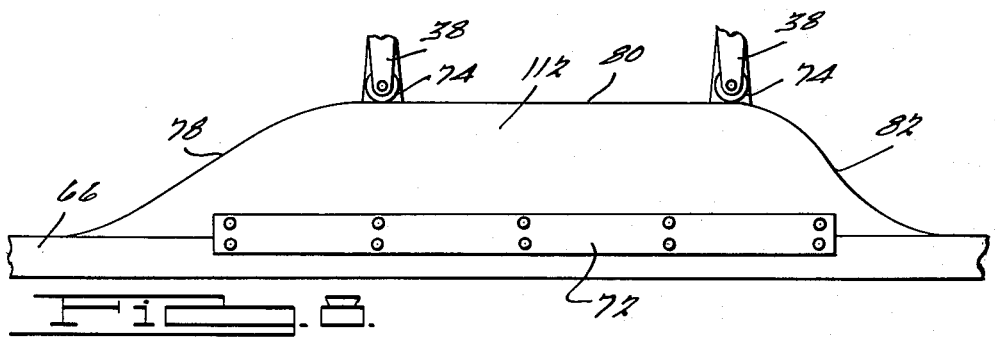
FIG. 8 is a fragmentary side elevation view of a skip cam on the reciprocable cam elevating mechanism.

Referring now to the drawings, and as may be best seen in FIGS. 1-3, a conveying machine constructed in accordance with the preferred embodiments of this invention is comprised of a central frame 10 including longitudinal base beams 12 and transverse base beams 14 extending between and affixed to the longitudinal base beams 12, providing therewith a base platform on which an aligned series of treating receptacles or tanks 16 are disposed. The upright portion of the central frame 10 is comprised of a series of spaced upright columns 18 rigidly secured at their lower ends to the transverse base beams 14, and interconnected at their upper ends by longitudinal support beams 20 and transverse support beams 22 forming therewith an elevated supporting platform on which the work carriers, drive mechanism, and elevating cam mechanism are mounted.

The particular conveying machine shown in the drawings, is of the turn-around type, wherein the work racks 24 and workpieces thereon are transferred in opposite directions along the straight side portions of the machine which are connected at each of their ends by arcuate turnaround sections. The work racks 24 are loaded on the conveying machine at a loading station indicated generally at 26 from which they are automatically conveyed through the treating receptacles 16 in a counter-clockwise direction as viewed in FIG. 1, and are periodically raised and lowered in order to transfer them over intervening tank partitions 28. At the completion of the treating sequence, the work racks 24 are removed at an unloading station generally indicated at 30 which is disposed adjacent to the loading station 26. Although the description of the present invention is in connection with a machine of the turn-around type as shown in the drawings, it will be appreciated by those skilled in the art that the specific embodiments herein described are equally applicable to conveying machines of the straight-through type wherein the workpieces are loaded at one end of the machine and are conveyed therealong through the treating sequence and unloaded at the opposite end thereof. It is also contemplated that the machines of the straight-through type can include more than one straight frame section joined at each of the ends thereof by other straight frame sections forming therewith an elongated conveying machine having an aligned or irregular path of transfer as may be required in view of a particular treating sequence or plant layout.

The work racks 24 are conveyed through the treating receptacles 16 by a series of work carriers 32 comprising a roller bracket 34 movably mounted on a supporting rail 36 and a work supporting arm 38 pivotally connected to the roller bracket 34 and extending laterally therefrom over the treating receptacles 16. At treating stations where an electrochemical or electroplating operation is to be performed on the workpieces supported on the work racks 24, electrification of the workpieces can be achieved by any of the means well known in the art including, for example, electrified supporting rail sections or electrified bus bars disposed above the treating receptacles 16 and adapted to contact the work racks as they are immersed therein.

The supporting rail 36 is of a continuous loop-shaped configuration comprising a pair of horizontal straight side sections connected at their ends by an arcuate turn-around rail section and is detachably secured at intervals to an upstanding flange of an angle iron stringer 40 as may be best seen in FIG. 5. The angle iron stringer 40 is rigidly secured to the upper surfaces of transverse support beams 22 and extends around the conveying machine in spaced substantially parallel relationship to the supporting rail 36. A suitable countersunk screw and nut assembly 42 can be employed for securing the supporting rail 36 to the angle iron stringer 40 employing a tubular spacer sleeve 44 disposed between the supporting rail and upstanding flange to achieve the appropriate spaced relationship therebetween. In installations wherein sections of the supporting rail 36 are supplied with an electrical current the spacer sleeve 44 is of an insulating material and the screw and nut assembly 42 is insulated from the angle iron stringer 40 by suitable insulating sleeves and washers.

To minimize frictional resistance between the roller bracket 34 and the supporting rail 36, the complementarily shaped cavity in the roller bracket 34 is provided with a plurality of side rollers 46 and top edge rollers 48 disposed in rolling bearing contact with the sides and top edge portion of the supporting rail 36, respectively. Suitable roller brackets 34 may also be utilized omitting the rollers therefrom which are slidably mounted on the supporting rail 36 in lieu of the bracket shown in the drawings incorporating rollers therein. The upper portion of the roller bracket 34 is provided with a pair of spaced lugs 50 for pivotally mounting the supporting arm therebetween on a suitable pivot pin 52.

The work carriers 32 are intermittently advanced along the straight and arcuate sections of the supporting rail 36 by a continuous flexible drive chain 54 extending around the conveying machine inwardly of and adjacent to the supporting rail 36 and trained over idler sprockets 56 rotatably mounted at substantially the center of curvature of each arcuate turn-around section as may be best seen in FIG. 1. The work carriers 32 are detachably secured to the drive chain 54 at selected intervals by means of suitable engaging pins (not shown) projecting downwardly from the roller bracket 34 and in engagement within suitable bores in the drive chain 54. Alternatively, suitable countersunk screws 58, as shown in FIG. 5, may be employed which extend upwardly through selected links of the drive chain 54 and having the shank end portion thereof in threaded engagement with the underside of the roller bracket 34. A suitable channel guide track 60, as shown in FIG. 5, may be provided at intervals along the path of travel of the drive chain 54 for guidance and support thereof. The channel guide track 60 is maintained in the appropriate position relative to the drive chain 54 by support brackets 62 affixed to the upper surface of transverse support beams 22 adjacent to and inwardly of angle iron stringer 40.

As the work carriers 32 are intermittently advanced along the supporting rail 36, the work supporting arms 38 extending laterally over the treating receptacles 16 are pivoted about pivot pin 52 to and from a lowered position and a raised position by means of a reciprocable cam elevating mechanism 64 disposed longitudinally of and outwardly from the straight side sections of the supporting rail 36. The reciprocable cam elevating mechanism is comprised of a longitudinally extending slide bar 66 of an inverted T-shaped cross section which is disposed in sliding engagement in a series of aligned guide shoes 68 rigidly secured to the upper surface of transverse support beams 22. A series of lifting cams 70 are detachably secured at spaced intervals to the upper portion of the slide bar 66 by means of suitable overlying brackets 72 as may be best seen in FIG. 5. The lifting cams 70 are positioned on the slide bar 66 relative to the tank partitions 28 in order to lift the work supporting arms 38 in appropriate sequence whereby the work racks 24 suspended therefrom are raised over the partitions 28 to allow transfer of the work racks to the next adjacent treating receptacle. The combination of the lifting cams 70 and the upper edge surfaces of the slide bar 66 provides a series of horizontal rail sections and lifting and lowering ramp sections providing for continuous support of the work supporting arm 38 during the raised and lowered positions and movement therebetween. Movement of the work supporting arms 38 from the lowered position, indicated in phantom, to a raised position, shown in solid lines in FIG. 5, is achieved by the coaction of a cam follower 74 rotatably mounted on supporting brackets 76 affixed to the work supporting arm 38 and the upper edge surface and lifting and lowering ramp portions of the slide bar and lifting cam, respectively. As shown in FIG. 5, the lifting cam 70 is preferably of an arcuate configuration corresponding to the arcuate path of travel of the cam follower 74 during the movement of the work supporting arm 38 to and from the raised and lowered positions, thereby assuring continuous bearing contact with the supporting ramp surface.

Figure 9:
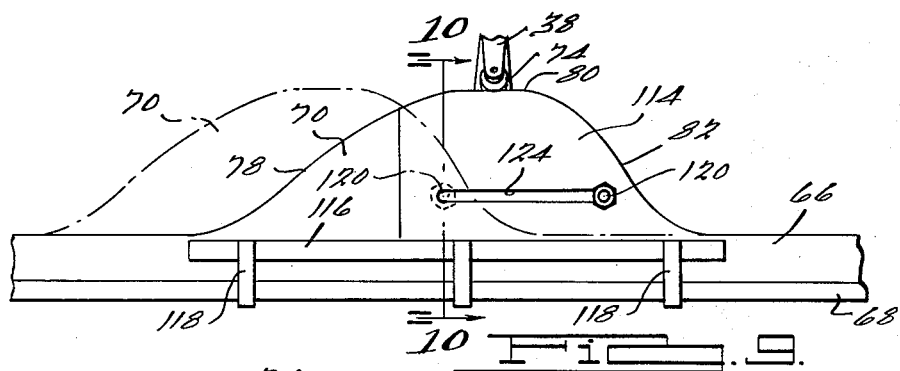
FIG. 9 is a fragmentary side elevation view of a secondary cam on the reciprocable cam elevating mechanism for providing delay-dip operation at selected treating stations.

Each of the lifting cams 70, as shown in FIG. 2 and FIG. 9, is comprised of a lifting ramp 78, a substantially flat top portion 80 and a lowering ramp 82. The angular incline of the lifting ramp 78 is preferably smaller in magnitude than the angular incline of the lowering ramp 82 to provide for a smooth gradual lifting of the work supporting arms 38 disposed in contact therewith. The substantially flat top portion 80 of the lifting cam 70 provides an elevated rest position for the cam followers 74 during the advancement of the work carriers and the work racks suspended therefrom over the partitions separating adjoining treating receptacles. The total length of each of the lifting cams 70 is slightly less than the distance between adjacent treating stations to enable lowering and raising of the work supporting arms 38 during the retracting stroke of the reciprocable cam elevating mechanism as will be subsequently described in detail.

As the work carriers 32 approach the arcuate turn-around sections of the conveying machine the cam followers 74 ride up on an overlying wedge portion of an arcuate cam track 84 stationarily affixed at each end of the machine as shown in FIG. 1 and FIG. 2. Similarly, as the work supporting arms 38 positioned on the arcuate cam tracks 84 approach the reciprocable cam elevating mechanism along the opposite side of the machine, the cam follower 74 thereon rides off a similar overlying wedge portion of the arcuate cam track 84 and in bearing contact with the upper edge of the slide bar 66. In accordance with this arrangement, the work supporting arms 38 are provided with a continuous support along their entire travel around the machine.

The lifting cams 70 which are detachably secured to the slide bar may be removed and repositioned thereon to adapt the machine to any specific treating cycle and treating receptacle arrangement. Additionally, the arcuate cam tracks 84 at each of the ends of the conveying machine may be provided with a stationary lifting cam surface to effect a lifting of the work supporting arm during its travel therearound to raise and lower a work rack over a tank partition disposed in the arcuate end sections of the treating receptacles.

As hereinbefore described, the intermittent advancement of the work carriers 32 is achieved by the drive chain 54 and the sequential raising and lowering of the work supporting arms 38 thereon is achieved by the reciprocable cam elevating mechanism 64 disposed along each of the straight side sections of the machine. In order to achieve satisfactory operation the advancing movement of the drive chain 54 must be coordinated with the reciprocating movement of the cam elevating mechanism 64. The conveying machine is shown in FIG. 2 in the position wherein the cam elevating mechanism 64 is in the fully retracted position, and in which position the work supporting arms disposed adjacent to tank partitions 28 are elevated with the cam followers thereof disposed on the flat top portions 80 of the lifting cams 70 preparatory to the next advancing stroke. In that position, the drive chain 54 and cam elevating mechanism 64 are concurrently advanced whereby the elevated work racks 24 are transferred over the tank partitions 28 and the work racks 24 disposed in the lowered position are advanced in that position to the next adjacent treating station. At the completion of the advancing movement the drive chain 54 is maintained stationary while the cam elevating mechanism commences its retracting stroke. During the initial portion of the retracting stroke of the cam elevating mechanism, the cam followers on the elevated work supporting arms roll down the lowering ramps 82 of the lifting cams 70 immersing the work racks 24 and workpieces thereon into the treating solution below. Further retraction of the cam elevating mechanism causes the lifting ramp 78 of the lifting cams 70 to engage the cam followers on the next adjacent work supporting arms causing the arms to be elevated to a position terminating at the point at which the cam followers thereon are positioned on the flat top portions 80 of the lifting cams 70. Accordingly, the retracting movement of the cam elevating mechanism achieves the lowering and raising of the work supporting arms in appropriate sequence.

The retracting movement of the cam elevating mechanism can be achieved in one continuous stroke or in two separate steps; the first step effecting a lowering of elevated work supporting arms and the second step effecting a lifting of work supporting arms disposed adjacent to a tank partition. The single stage retracting movement of the cam elevating mechanism has the disadvantage that in a single station tank, the work supporting arm after being lowered by one cam doing the initial retracting movement is immediately raised by lifting ramp of the next adjacent cam during the final retracting movement. The resultant action is that of momentarily dipping the work rack into the treating tank instead of immersing it for a predetermined time interval. Accordingly, when single station treatment is desired it is necessary to utilize a two station treating tank to provide sufficient down-dwell time when using the single stroke retracting operation. Such an arrangement increases the length of tanks required for a given treating sequence and may be undesirable in some installations and accordingly, an alternate and preferred method utilizes a two-stage retracting movement of the cam elevating mechanism.

In the two-stage retracting operation, the cam elevating mechanism commences the first stage retracting movement after the drive chain and cam elevating mechanism have attained the fully advanced position. During the first stage retracting movement the work supporting arms disposed in an elevated position are lowered by movement down the lowering ramps 82 of the lifting cams 70. At that instant, the retracting movement of the cam elevating mechanism is halted and a suitable down-dwell timer is energized which commences to time a predetermined treating period. At the expiration of the down-dwell period, the second stage retracting movement of the cam elevating mechanism commences whereby the next work supporting arms disposed adjacent to tank partitions are elevated by the relative movement of the lifting ramps 78 of the lifting cams 70 until the fully elevated position is attained. At that instant, the drive chain 54 and cam elevating mechanism are simultaneously actuated and commence their forward advancing movement as heretofore described.

The coordinated movement of the cam elevating mechanism to and from an advanced and a retracted position in conjunction with the intermittent advancing movement of the drive chain 54 is accomplished by a drive mechanism incorporating linkage means therein mounted on the central frame as may be best seen in FIGS. 6 and 7. The drive mechanism comprises an electric motor 86 drivingly coupled to a gear box 88 having a vertically disposed output shaft 90 to the end portion of which is affixed a crank 92. A connecting rod 94 is pivotally connected at one end thereof to the end of the crank 92 and at the other end thereof to an actuating lever 96 which is pivotally mounted at one end thereof on a bearing 98 affixed to a transverse support beam 22. As the crank 92 rotates in the direction as shown by the arrow in FIG. 6, the actuating lever 96 is caused to oscillate to and from a forward position and a rearward position. The oscillating movement of the actuating lever 96 is transmitted to an equalizer lever 100 pivotally mounted at the midpoint thereof to a transverse support beam 22 by means of tie rod 102 pivotally mounted at one end to the end of the actuating lever 96 and at the other end thereof to one end of the equalizer lever 100. A drag link 104 is pivotally connected to each end of the equalizer lever 100 and extends substantially longitudinally of the cam elevating mechanism and is pivotally connected to inwardly extending ears 106 connected to the slide bars 66. By this arrangement, the oscillating movement of the equalizer lever 100 imparts a reciprocating movement to the cam elevating mechanism at each side of the machine and in opposite directions. Concurrent movement of the drive chain 54 is achieved by a ratchet dog 108 pivotally mounted at the end of actuating lever 96 and resiliently biased by a coil spring 110 so as to engage the links of the drive chain during the movement of the actuating lever from a rearward position to a forward position. The engaging portion of the ratchet dog 108 is of a configuration so as to slide across the links of the drive chain 54 during the movement of the actuating lever 96 from the forward position to the rearward position. The coil spring 110 connected to the actuating lever and the free end of the ratchet dog 108 indexes the engaging portion of the ratchet dog into an engaging position assuring continuous engagement with the drive chain during the forward movement of the actuating lever.

The interconnection between the actuating lever 96 which causes the drive chain 54 to be advanced and the equalizer lever 100 which causes the cam elevating mechanisms to be reciprocated assures appropriate relative movement of the work carriers in relationship to the lifting cams. In the arrangement as shown, particularly in FIG. 6, rotation of the crank 92 from the position indicated at A in a clockwise direction to the position indicated at B is effective to advance the drive chain and the work carriers connected thereto the length of one station between adjoining treating stations and is simultaneously effective to advance each of the cam elevating mechanisms from the retracted position to the advanced position. Rotation of the crank 92 from the position indicated at B to the position indicated at A is effective to cause retraction of the cam elevating mechanisms from the fully advanced position to the fully retracted position and during which movement the drive chain 54 is not retracted by virtue of the ratcheting action of the ratchet dog 108. A suitable resiliently biased pivoted locking ratchet 111 as shown in FIG. 6 may be employed for engaging the drive chain 54 preventing it from retracting during the retracting movement of the cam elevating mechanism. When a two-stage retracting movement of the cam elevating mechanism is desired as heretofore described, a limit switch LS1 adjustably affixed to the upper surface of the gear box 88 and positioned so as to be actuated by the crank 92 can be employed for de-energizing the electric motor 86 when the crank attains a position indicated at C which coincides with the point of travel at which the cam elevating mechanisms have been retracted sufficiently to lower all of the elevated work supporting arms and prior to the point at which the lifting ramps on the lifting cams engage the next adjacent work supporting arms. To avoid overrun of the drive mechanism due to the inertia of the moving parts, a suitable magnetic clutch (not shown) may be employed in the motor drive to stop the electric motor 86 when the limit switch LS1 is tripped. In addition to de-energizing the electric motor 86, limit switch LS1 when actuated also simultaneously energizes a suitable dwell timer which commences to time a pre-settable down-dwell period. At the expiration of the down-dwell period, the timer re-energizes the electric motor 86 causing the crank to rotate from the position C in a clockwise direction until the crank again trips limit switch LS1.

In a similar manner, when a one-stage retracting movement of the cam elevating mechanism is desired, the limit switch LS1 is located so as to be tripped when the crank 92 attains the position indicated at A. In that position, the cam elevating mechanisms are in the fully retracted position preparatory to the next advancing stroke. Tripping of the limit switch in that position energizes a suitable dwell timer which commences to time a pre-settable dwell period and at the expiration of which the electric motor 86 is again energized causing the crank 92 to undergo one complete revolution until it is again stopped in position A. It is also contemplated that the rotation of the crank 92 may be on a continuous basis whereby the cam elevating mechanisms undergo a continuous reciprocating movement. By virtue of the continuous operation of the electric motor 86, the down-dwell period of the workpieces in the treating receptacles would be established by the speed of rotation of the crank 92. Accordingly, the total processing time as well as the treating time in each of the treating receptacles can simply be regulated by utilizing a variable speed reduction gear box 88 or variable speed motor obviating the necessity of auxiliary controls.

It is apparent from the foregoing description of the novel conveying machine comprising the present invention that the conveying machine provides simple and automatic movement of the workpieces through a prescribed treating sequence, wherein each of the workpieces are subjected to the same treating cycle. The versatility and flexibility of the machine to adapt to alternate treating cycles by repositioning the lifting cams on the cam elevating mechanism can be simply achieved without requiring modifications of the drive mechanism or control system. Additional flexibility and versatility can be incorporated into the machine by providing for skip and delay-dip operations wherein selected work racks completely skip immersion in one or more treating receptacles or wherein the work racks are immersed at a delayed point of time after the remaining racks have been immersed in the treating solutions.

Skip operation of the work racks at one or more treating stations can be simply achieved by incorporating a skip cam 112 as shown in FIG. 8 having a flat top portion 80 of a length equal to one or multiples of one advancing stroke of the cam elevating mechanism and drive chain. Accordingly, the work supporting arm 38 is maintained in the elevated position by the coaction of the cam follower on the elongated flat top portion 80 of the skip cam 112 for one or more treating stations and is thereafter lowered by the lowering ramp 82 in a manner similar to that employed on the conventional lifting cams 70 heretofore described.

Figure 10:
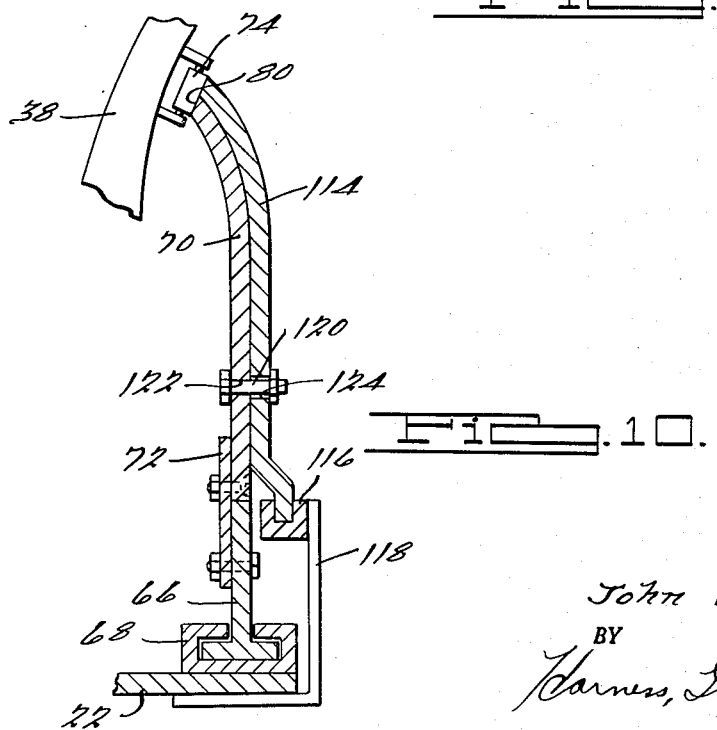
FIG. 10 is a fragmentary transverse vertical section view of the secondary cam and reciprocable cam elevating mechanism as shown in FIG. 9 and taken along line 9—9 thereof.

A delayed set down of the work racks 24 at the first station of a multiple station tank, for example, is simply achieved by incorporating a secondary or lost motion cam 114 as shown in FIGS. 9 and 10 and having a configuration conforming to the forward portion of the lifting cam 70. The secondary cam 114 includes a flat top portion 80 and lowering ramp portion 82 corresponding to the flat top portion and lowering ramp of the lifting cam 70. The base portion of the secondary cam 114 is laterally offset and is disposed in sliding engagement in a slide guide 116 having a U-shaped cross section which is fixedly secured in substantially parallel spaced relationship by brace members 118. The slide guide 116 extends longitudinally of the cam elevating mechanism a distance corresponding substantially to the reciprocating travel of the cam elevating mechanism thereby providing continuous support for the secondary cam 114. The base portion of the secondary cam 114 is snugly fitted into the slide guide 116 providing for frictional resistance that resists relative movement therebetween. A slide bolt and nut assembly 120 extends through an aperture 122 in the forward portion of the lifting cam 70 and is disposed in sliding relationship in elongated slot 124 in the secondary cam 114 maintaining the secondary cam in appropriate sliding engagement with the lifting cam and drivingly connects the secondary cam to the cam elevating mechanism. When a delayed set down operation is not desired, the slide bolt and nut assembly 120 is tightened wherein the secondary cam 114 is positioned in alignment with the lifting cam 70 and reciprocates in unison therewith. When a delayed set down operation is desired, the slide bolt and nut assembly is loosened, whereby the secondary cam 114 remains in the advanced position by the frictional coaction thereof with the slide guide 116 during the initial retracting movement of the cam elevating mechanism and whereby a work supporting arm 38 having its cam follower 74 supported on the flat top portion 80 thereof is retained in the elevated position during the initial retracting movement instead of being permitted to be lowered along the lowering ramp 82. At the completion of the first stage retracting movement, the lifting cam 70 is disposed relative to the secondary cam 114 as shown in phantom in FIG. 9 and wherein the slide bolt and nut assembly 120 has moved to the left and is disposed in abutting engagement against the left end of the elongated slot 124. Further retraction of the cam elevating mechanism causes the secondary cam 114 to be retracted by the coaction of the slide bolt and nut assembly 120 whereby the work supporting arm 38 is lowered along the lowering ramp 82 of the secondary cam 114. During the following advancing movement of the cam elevating mechanism the secondary cam 114 remains stationary until the slide bolt and nut assembly moves through a displacement corresponding to the length of the elongated slot 124 at which time the secondary cam is engaged and is advanced simultaneously with the lifting cam 70 to the fully advanced position. In conveying machines incorporating the delayed set down mechanism as shown in FIGS. 9 and 10, the cam followers 74 are provided with sufficient width so as to engage and overlie the ramp surfaces of both the lifting cam 70 and the secondary cam 114.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. A processing machine, the combination comprising a rail, a work carrier movably mounted on said rail having an arm extending laterally of said rail, flexible drive means extending longitudinally of said rail for intermittently advancing said work carrier along said rail, longitudinally reciprocable elevating means disposed adjacent to said rail having thereon a plurality of longitudinally spaced cams interconnected by intervening straight track sections forming a continuous track, each of said cams having at least one surface spaced from the longitudinal axis of said elevating means such that contact of said cam surface and said arm upon longitudinal reciprocation of said elevating means relative to said arm causes said arm to be elevated and lowered thereby, and means for intermittently advancing said drive means in synchronization with the advancing movement of said elevating means and for retracting said elevating means.

2. A processing machine, the combination comprising a rail, a work carrier movably mounted on said rail having an arm extending laterally of said rail, flexible drive means connected to said carrier and extending longitudinally of said rail for intermittently advancing said work carrier along said rail, longitudinally reciprocable elevating means disposed adjacent to said rail having thereon a plurality of longitudinally spaced cams interconnected by straight sections forming a continuous track, each of said cams having a lifting surface and a lowering surface connected by an intermediate surface, said arm movable to a raised position by said elevating surface and to a lowered position by said lowering surface as said elevating means is retracted, said arm being supported in the raised position by said intermediate surface and longitudinally advanced along said rail in that position by said flexible drive means, and means for intermittently advancing said drive means in synchronization with the advancing movement of said elevating means and for retracting said elevating means.

3. A conveying apparatus comprising a frame, a work supporting rail mounted on said frame, a plurality of work carriers movably mounted on said rail, each of said work carriers including a pivotally mounted work supporting arm extending laterally of said supporting rail, a flexible drive member extending along said rail and connected at spaced intervals to said work carriers for intermittently advancing said carriers along said supporting rail, a longitudinally reciprocable cam elevating mechanism slidably mounted on said frame laterally of said supporting rail and having a cam track thereon for supporting said work supporting arms intermediate the ends thereof, said cam track comprising a series of longitudinally spaced lifting cams and intervening horizontal track sections forming a continuous track, said work supporting arms movable from and to a raised position and a lowered position by said lifting cams in a predetermined sequence as said reciprocating cam track is reciprocated longitudinally with respect to said work carriers, and power means for intermittently advancing said flexible drive member and for reciprocating said cam elevating mechanism.

4. A conveying apparatus comprising an elongated central frame, a work supporting rail mounted on and encircling said frame and comprising a pair of straight side sections connected at the ends thereof by arcuate sections, a plurality of work carriers movably mounted on said supporting rail, each of said work carriers including a work supporting arm extending outwardly and laterally from said supporting rail, a chain sprocket rotatably mounted at substantially the center of curvature of each of said arcuate sections, a flexible drive chain trained over said sprockets and extending adjacent to and along the entire length of said supporting rail and connected at spaced intervals to said work carriers for intermittently advancing said carriers along said supporting rail, a reciprocable cam elevating mechanism mounted on said frame and disposed longitudinally along each of said straight side supporting rail sections, said cam elevating mechanism including a cam track comprising a series of longitudinally spaced lifting cams and horizontal sections forming a continuous track for laterally supporting said work supporting arms along said side sections and moving said supporting arms to and from a raised position and a lowered position in a predetermined sequence upon longitudinal reciprocation of said elevating mechanism, an arcuate cam track concentrically disposed adjacent each of said arcuate supporting rail sections for laterally supporting said work supporting arms along said arcuate rail sections, and power means for concurrently advancing said flexible drive chain and said cam elevating mechanisms and for retracting said cam elevating mechanisms.

5. In a processing machine, the combination comprising a rail, a work carrier movably mounted on said rail having an arm extending laterally of said rail, flexible drive means for intermittently advancing said work carrier along said rail, longitudinally reciprocable elevating means disposed adjacent to said rail including a first cam having at least one surface spaced from the longitudinal axis of said reciprocable elevating means, second cam means having a configuration similar to said first cam means mounted adjacent and to the side of said first cam means and movable along a path substantially parallel to that of said reciprocable elevating means, and means for reciprocating said reciprocable elevating means and for moving said second cam means.

6. In a processing machine, the combination comprising a rail, a work carrier movably mounted on said rail having an arm extending laterally of said rail, flexible drive means for intermittently advancing said work carrier along said rail, longitudinally reciprocable elevating means disposed adjacent to said rail including a first cam having at least one surface spaced from the longitudinal axis of said reciprocable elevating means, second cam means having a configuration similar to said first cam means mounted adjacent and to the side of said first cam means and movable along a path substantially parallel to that of said reciprocable elevating means, and connecting means connecting said second cam means to said reciprocable elevating means, said connecting means being adjustable to a first position to cause said second cam means to reciprocate with said reciprocable elevating means and a second position to cause said second cam means to be retracted only a portion of the length of a full stroke of said reciprocable elevating means.

7. In a processing machine, the combination comprising a rail, a work carrier mounted on said rail having an arm extending laterally of said rail, flexible drive means for intermittently advancing said work carrier along said rail, longitudinally reciprocable elevating means disposed adjacent to said rail including a plurality of longitudinally spaced cams thereon, each of said cams having a lifting surface and a lowering surface spaced from the longitudinal axis of said longitudinally reciprocable elevating means such that contact of said arm with said lifting surface and said lowering surface causes said arm to be elevated and lowered during the retracting movement of said reciprocable elevating means, means for reciprocating said reciprocable elevating means, and means for maintaining said arm in the raised position for at least two successive advancing movements of said flexible drive means.

8. A conveying apparatus comprising a frame, a work supporting rail mounted on said frame, a plurality of work carriers movably mounted on said rail, each of said work carriers including a pivotally mounted work supporting arm extending laterally of said supporting rail, a flexible drive member extending along said rail and connected at spaced intervals to said work carriers for intermittently advancing said carriers along said supporting rail, a longitudinally reciprocable cam elevating mechanism slidably mounted on said frame adjacent to said supporting rail including a plurality of longitudinally spaced cams, each of said cams having a lifting surface and a lowering surface connected by an intermediate surface, each of said arms movable to a raised position by said lifting surface and to a lowered position by said lowering surface as said cam elevating mechanism is retracted, said arm being supported in the raised position by said intermediate surface and longitudinally advanced along said supporting rail in that position by said flexible drive member, one of said cams having said intermediate surface thereof of a length sufficient for maintaining at least one of said supporting arms in the raised position for at least two successive advancing movements of said cam elevating mechanism thereby providing a skip operation, and power means for concurrently advancing said flexible drive member and said cam elevating mechanism and for retracting said cam elevating mechanism.

References Cited in the file of this patent

UNITED STATES PATENTS

| | | |
|---|---|---|
| 1,961,856 | Hall | June 5, 1934 |
| 2,633,855 | Ransohoff | Apr. 7, 1953 |
| 2,983,360 | Davis | May 9, 1961 |